Figure 1:
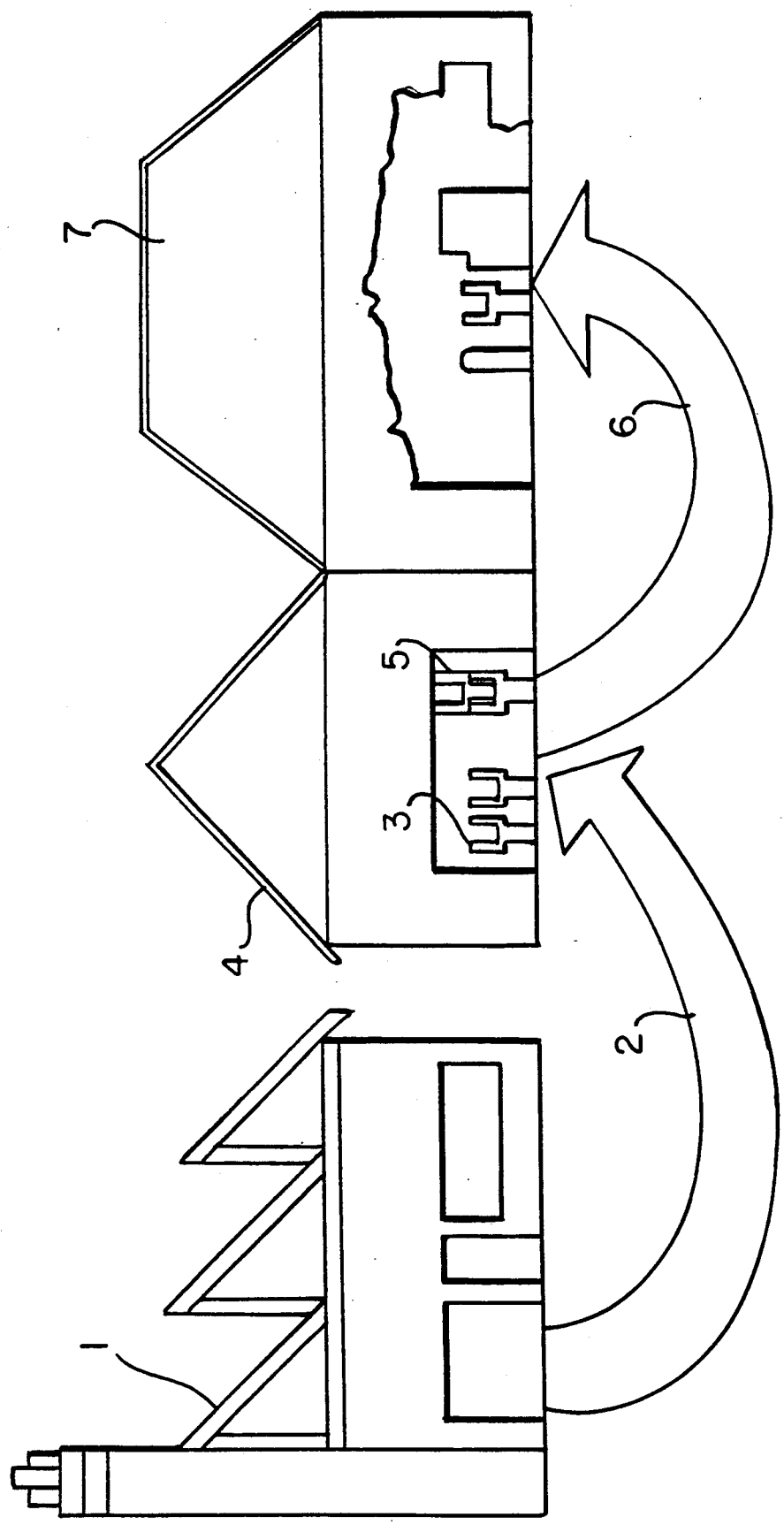

United States Patent [19]

Appelberg

[11] Patent Number: 5,188,503
[45] Date of Patent: Feb. 23, 1993

[54] MAGAZINE FOR STORING AND TRANSFERRING METAL RODS

[75] Inventor: Bengt Appelberg, Lidköping, Sweden
[73] Assignee: Bas Teknik AB, Lidkoping, Sweden
[21] Appl. No.: 713,108
[22] Filed: Jun. 11, 1991
[51] Int. Cl.⁵ .............................................. B65G 57/18
[52] U.S. Cl. ............................... 414/745.1; 414/22.62; 414/608; 211/49.1
[58] Field of Search ..................... 414/22.62, 267, 608, 414/745.7, 745.9, 746.1, 923, 924, 745.1; 211/49.1, 60.1, 70.4

[56] References Cited

U.S. PATENT DOCUMENTS

| | | | |
|---|---|---|---|
| 3,157,424 | 11/1964 | Hall | 211/49.1 X |
| 3,173,556 | 3/1965 | Gaudriot et al. | 414/923 X |
| 3,175,693 | 3/1965 | Steel | 211/49.1 |
| 3,452,887 | 7/1969 | Larson et al. | 211/60.1 X |
| 3,503,519 | 3/1970 | Jay | 211/60.1 |
| 3,945,497 | 7/1976 | Greenberg | 211/49.1 X |
| 4,045,071 | 8/1977 | Dunstan | 414/608 X |
| 4,571,141 | 2/1986 | Gieson | 414/608 X |

FOREIGN PATENT DOCUMENTS

| | | | |
|---|---|---|---|
| 2411796 | 7/1979 | France | 414/608 |
| 0194936 | 11/1984 | Japan | 414/746.1 |
| 0892665 | 3/1962 | United Kingdom | 211/70.4 |

*Primary Examiner*—Michael S. Huppert
*Assistant Examiner*—James Keenan
*Attorney, Agent, or Firm*—Dennison, Meserole, Pollack & Scheiner

[57] ABSTRACT

In the steel industry metal rods (18) are transported from a steel mill (1) to a consumer (7). During transport the rods (18) are subjected to rough treatment so that they are usually no longer straight upon arrival and must therefore be straightened. According to the invention the straightening step is eliminated by the rods (18) being placed in a magazine (3) which thus protects them during transport.

9 Claims, 6 Drawing Sheets

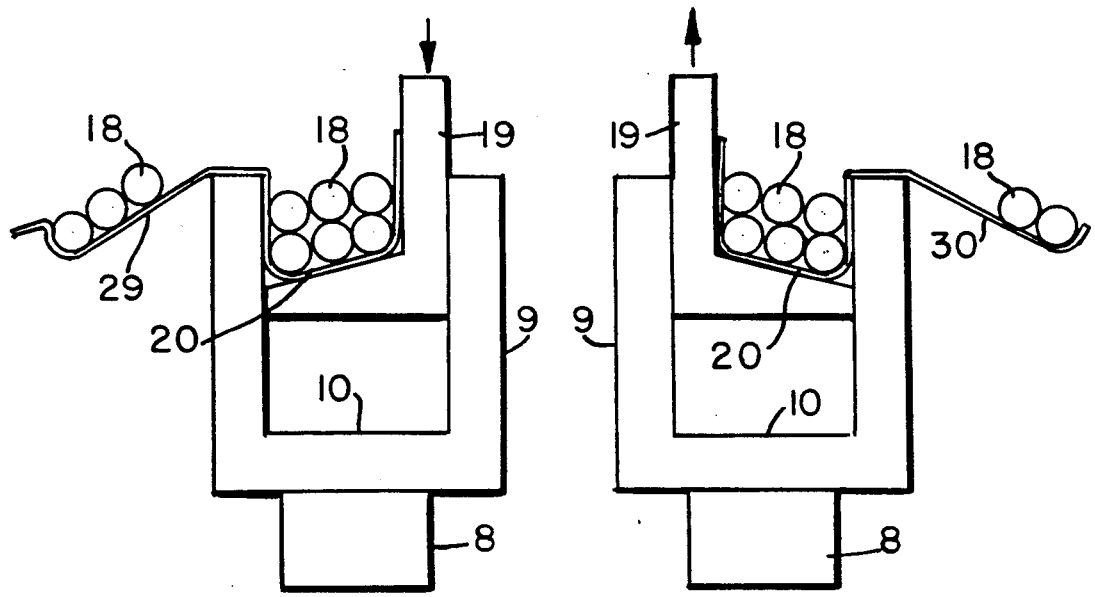
Fig. 5.  Fig. 6.
Fig. 7.  Fig. 8.
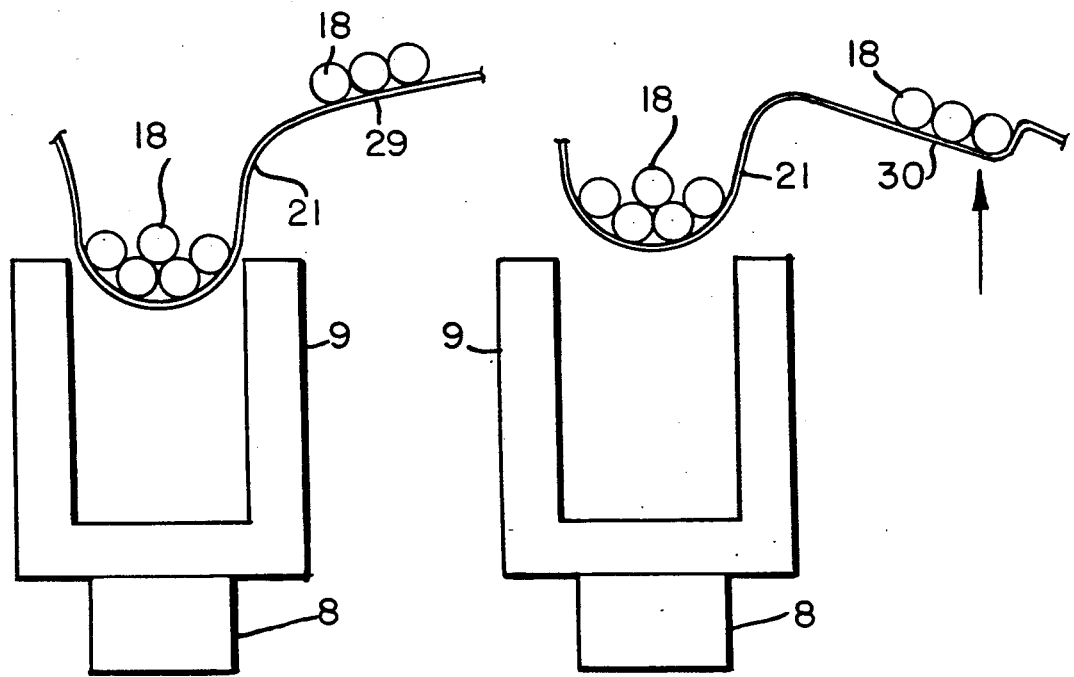

MAGAZINE FOR STORING AND TRANSFERRING METAL RODS

The present invention relates to a method of transferring elongated units from a manufacturing place to a consumption place. The elongated units may be of various materials but it has been found that problems arise primarily when the elongated units consist of metal rods which have been surface-treated, for instance. It is essential that rods manufactured in a steel mill and then transported to the place where they are to be used are not damaged on the surface, for instance, or so that they are no longer straight. Damage of this type occurs during transport from a steel mill to a consumption place and the iron rods must therefore be straightened upon arrival at the consumption place to enable them to be used in automatic machines for producing various articles.

The object of the present invention is to enable transport of iron rods from a steel mill to a consumption place where the rods can be supplied immediately, with no prior treatment, to the working machines. This is achieved according to the invention in that rods manufactured in a steel mill are placed in a magazine, which magazine is then transported to a consumption place where they can be taken directly from the magazine and supplied to a machine such as a lathe of some kind.

According to the invention magazines having U-shape elements are placed one after the other and spaced apart on a base unit. The yoke portion of each U-shaped element is located at the bottom and the two legs are directed upwardly. The elongated units can be placed between the legs and yoke portion of the U-shaped element. The base unit is provided with two transverse walls which are displaceable along the base unit and can be folded down or removed therefrom. The end walls prevent axial movement of the long units loaded into the magazine.

At the site where the long units are manufactured, they are placed on a table or the like and moved transversely therefrom to contact surfaces arranged between the U-shaped elements. The units are transferred to these contact surfaces transversely and as the number of units increases, the contact surface is gradually lowered until the U-shaped element has been filled with units.

The contact surface described above may consist of a flexible strip or of an inclined plane which preferably has an outwardly inclining surface. The U-shaped element is provided with retaining members to retain long units placed in the elements. The loaded magazine is transported either to a warehouse for temporary storage or directly to a place where it is to be used and the units are unloaded from the magazine by means of contact surfaces of the same type as those used for loading. The contact surfaces are gradually raised and the long units are transferred to a table from which, undamaged, they can be conveyed directly to working machines.

The inner sides of the U-shaped elements are so designed that long units placed in the elements are not externally damaged.

The magazines can be stacked one on top of another or even stacked inside each other. In the latter case the magazines are empty and the end walls either folded down or removed.

Additional features of the present invention are revealed in the appended claims.

Figure 2:
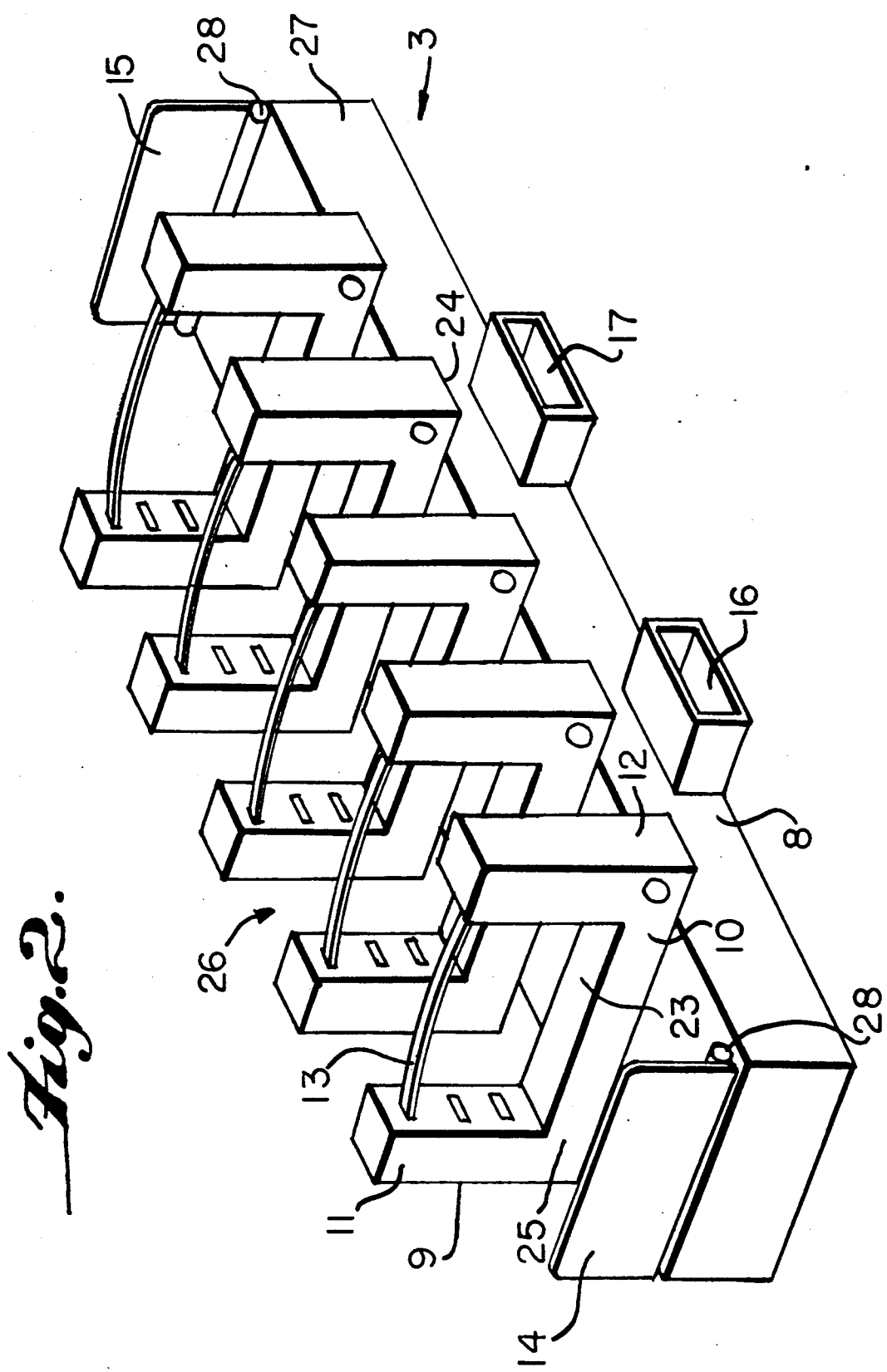
Figure 3:
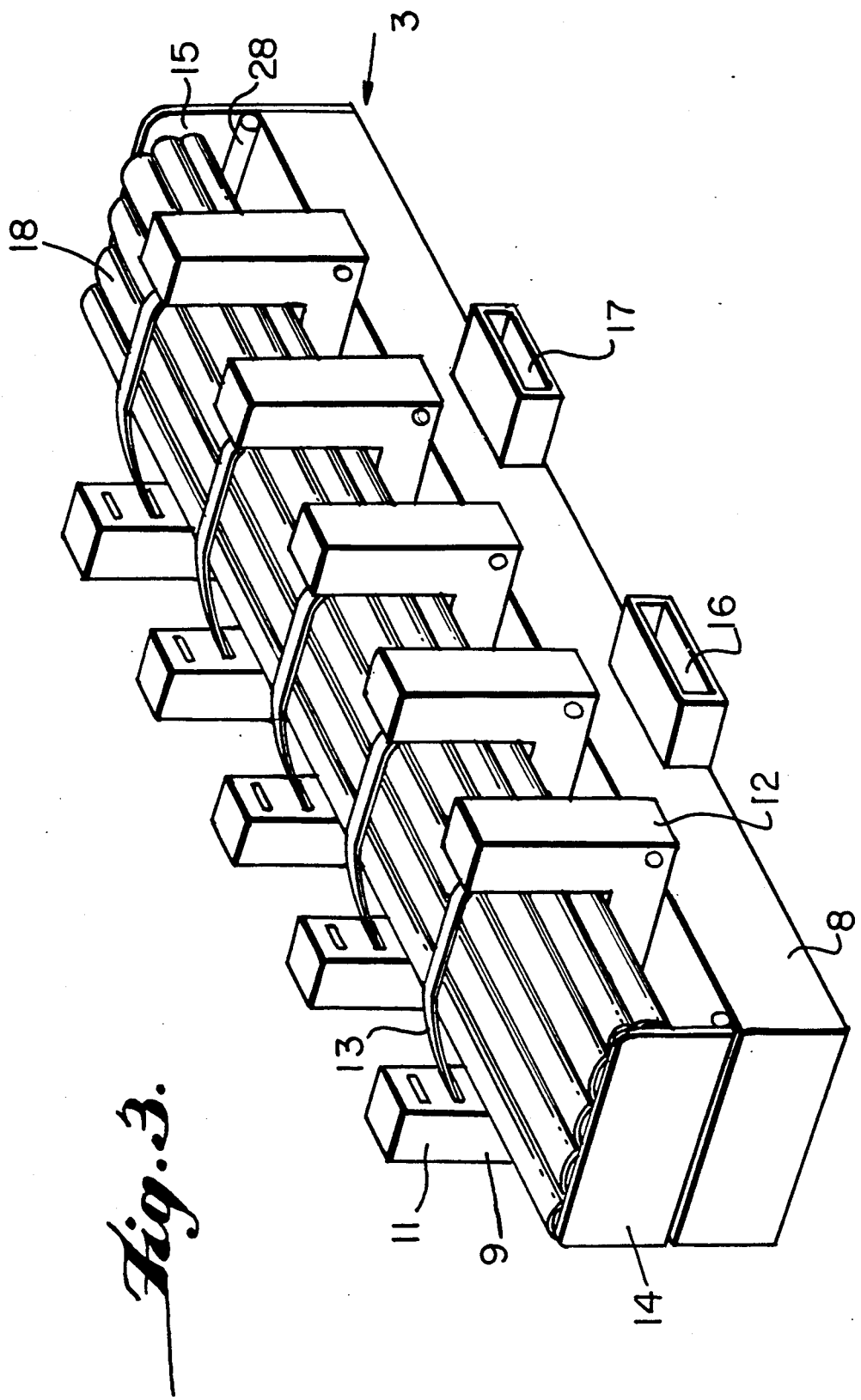
Figure 4:
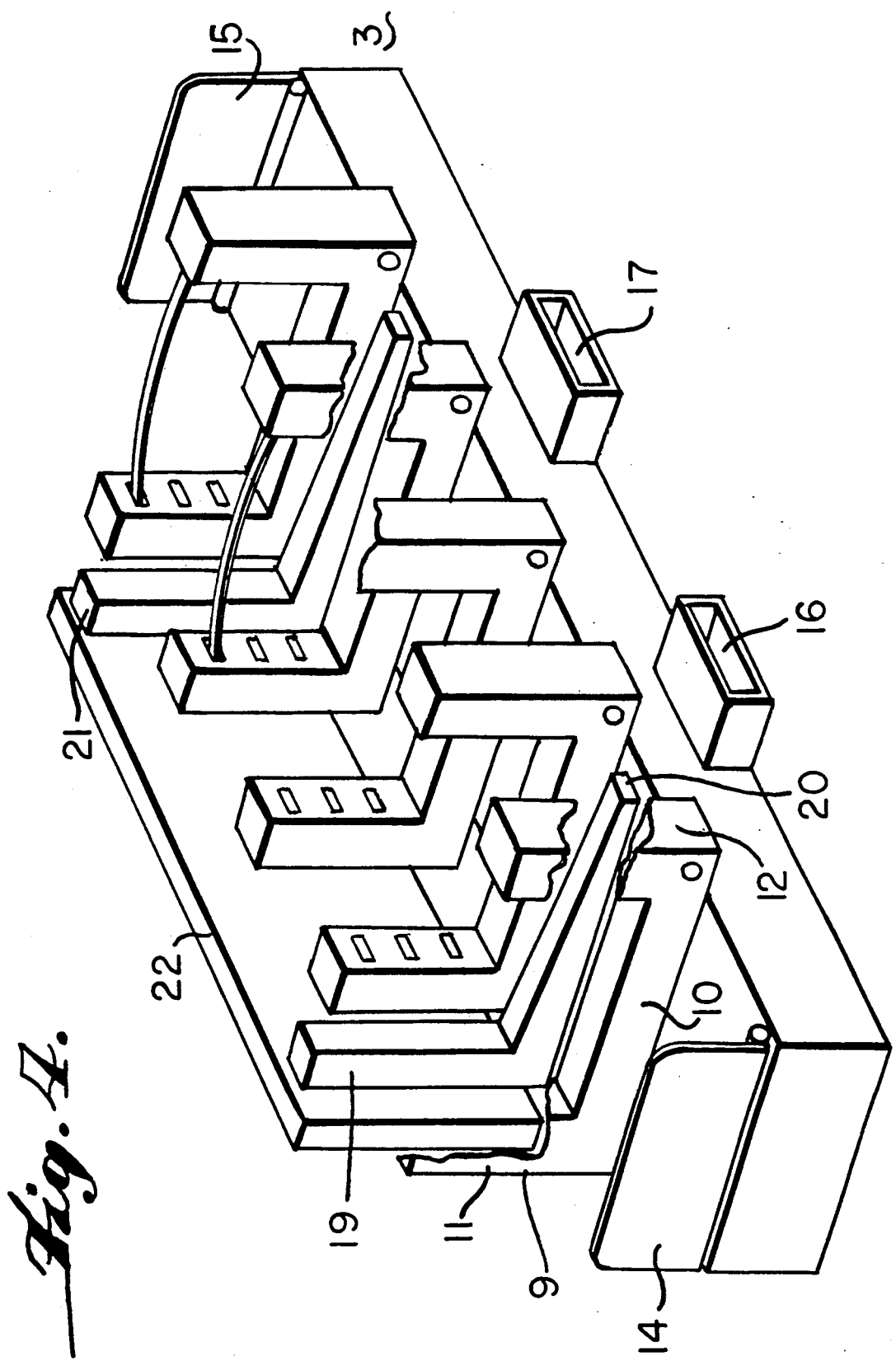
Figure 10:
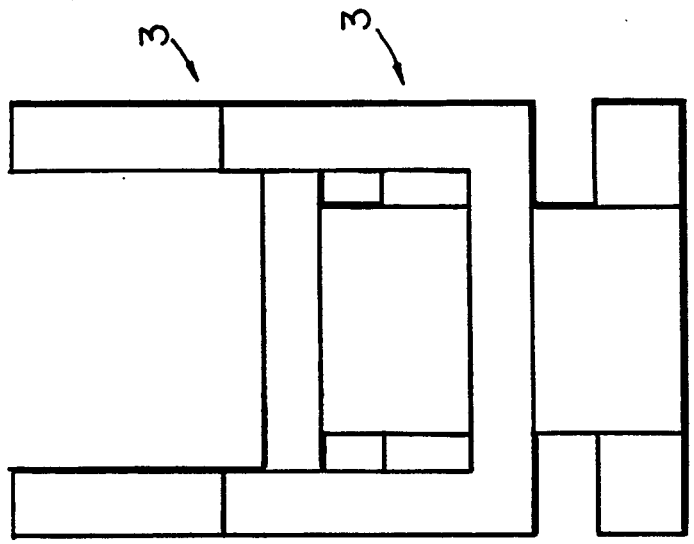
Figure 9:
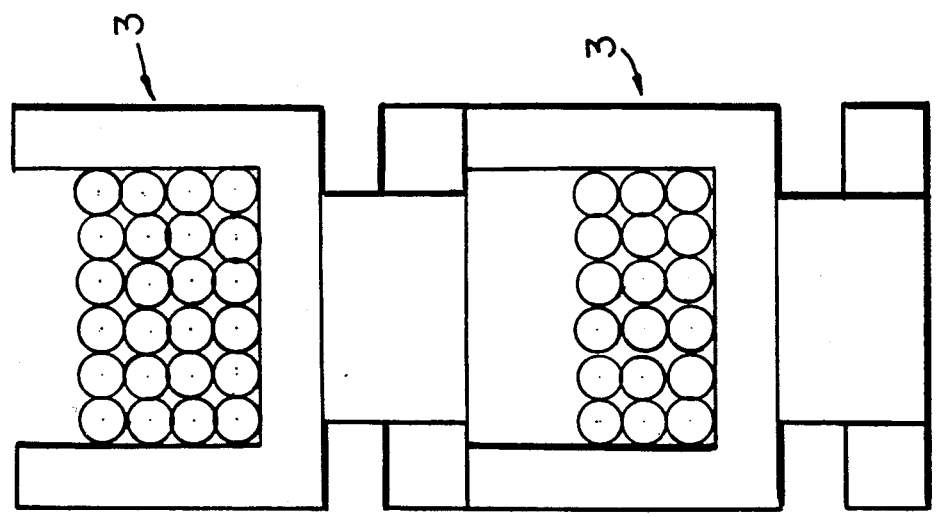

The invention will be described in more detail with reference to the accompanying seven figures of the drawings in which FIG. 1 shows an industrial plant, FIG. 2 shows a magazine according to the invention when empty, FIG. 3 shows a magazine when loaded, FIG. 4 shows an empty magazine with contact surfaces, FIGS. 5 and 6 show a cross section through a magazine with contact surface during a loading stage and during an unloading stage, FIGS. 7 and 8 also show a cross section of a magazine during loading and unloading of elongate objects, in which the contact surfaces consist of strips, FIG. 9 shows loaded magazines stacked on top of each other, and FIG. 10 shows empty magazines stacked inside each other.

FIG. 1 shows a steel mill 1 with transport route 2 for loaded magazines to a stockroom 4. Magazines stacked on top of each other are also shown in the stockroom. Magazines containing elongated units are transported along route 6 from the stockroom 4 to a manufacturing station 7 where the rods are unloaded and supplied to working machines.

FIG. 2 shows a magazine 3 with base unit 8. Five U-shaped elements 9 are placed on the base unit, each element having a yoke portion 10 and two legs 11 and 12. A retaining member 13 for the elongate units is arranged between the two legs. At each end of the base unit 8 is an end wall, 14 15, respectively. These end walls are displaceable in a longitudinal direction and can also be folded down or even removed. The base unit 8 has two openings 16 and 17 to receive the prongs of a fork-lift stacker which can lift the magazine and place it on a truck for transport to a consumption place where once again a fork-lift stacker can unload the magazine.

FIG. 3 shows a magazine loaded with elongated units. It is quite clear from the figure that the long units rest on the yoke portions of the U-shaped elements 9 and that the units are retained by retaining members 13. The ends of the units abut against the end walls 14 and 15. They are thus firmly held in the magazine and are unable to move either laterally or longitudinally. They can therefore be moved from a manufacturing place to a consumption place without being damaged in any way. The elongated units are designated 18.

More specifically, the yoke portion 10 of each U-shaped element 9 comprises a rectangular horizontal member formed of a top planar surface 23, a bottom surface 24 and two side surfaces 25. The top planar surface 23 of yokes 10 collectively form a support surface for the elongated articles. Spaces 26 are provided between the U-shaped elements. The spaces 26 extend upwardly from the base 8 and are open in all directions. The base unit 8 also includes a skirt 27 which contains the openings 16 and 17 and which supports end walls 14 and 15. The end walls 14 and 15 are carried on the base by means of conventional hinges 28 which permit the walls to be pivoted from a flat stored position to a vertical operative position shown in FIG. 2.

FIG. 4 shows a wall 22 which is vertically movable. On the wall are two brackets 19 and 21, each having a contact surface or inclined plane which, in the case of bracket 19, is designated 20. Each contact surface is arranged between two U-shaped elements. The wall 22 with the two brackets 19 and 21 may either act as an unloading member or as a loading member and for this reason such an arrangement is provided at both the loading and the unloading station.

FIG. 5 shows how the bracket 19 with its contact surface 20 serves as a loading member. At the start of loading the inclined contact surface 20 is placed at the top of the leg 11. Here the elongate units are passed one by one from a loading support table 29 to abutment against the contact surface 20. As the surface is filled with units 18, the bracket 19 is gradually lowered so that the U-shaped element is filled with long objects and, when fully loaded, the long units 18 are in contact with the yoke portion of the U-shaped element. The long units are then firmly secured in the U-shaped element by means of the retaining member 13. The bracket 19 can be removed from the loading member by a lateral movement. FIG. 5 also shows the base unit 8 as being narrower than yokes 10.

FIG. 6 shows how a magazine filled with units 18 can be unloaded. This is done by gradually raising the bracket 19 so that the units 18 can roll one by one over the upper edge of the leg 12 onto an unloading table 30.

FIGS. 7 and 8 show a magazine being loaded and unloaded, respectively. Instead of the bracket 19, a strip 21 is used as contact surface here and during both unloading and loading the strip must perform the same movements as said bracket 19.

FIG. 9 shows two fully loaded magazines 3 and 3' stacked one on top of the other. When the magazines are empty they can be stacked inside each other, thus requiring less space. The end walls 14 and 15 must of course be removed or folded down if the magazines are to be stacked inside each other.

I claim:

1. A magazine for storing and transporting elongated articles comprising a generally rectangular flat base having a length dimension much greater than the width, a plurality greater than two of open, rigid, U-shaped members fixed to said base along the length thereof in spaced, parallel relationship perpendicular to the length dimension, each U-shaped member including two upstanding legs of equal length joined by a rectangular horizontal member formed of top, bottom and side planar surfaces, the top surfaces of said plurality of U-shaped members collectively forming a support surface for said elongated articles, said collective support surface being spaced from said base by said side surfaces, the spaces between each U-shaped member being open in a direction facing away from said base, an end wall pivotally mounted to said base at each end portion thereof to be movable from an open level position to a closed vertical position to prevent axial sliding of said elongated elements; and means insertable in the spaces between said U-shaped members to raise and lower said elongated articles with respect to said collective support surface.

2. The combination as claimed in claim 1 wherein said rectangular base includes a skirt portion for contacting a floor, and recesses in said skirt portion for receiving the lifting arm of a transport device.

3. The combination as claimed in claim 1 including tie down strap means bridging the upstanding legs to secure the elongated articles within the magazine.

4. The combination as claimed in claim 1 wherein the means insertable in the spaces between said U-shaped members to raise and lower said elongated articles comprise a plurality of inclined planes.

5. The combination as claimed in claim 4 wherein said inclined planes are secured to a common operator with the angle of inclination slanting away from the common operator in the direction of the spaces between the U-shaped members.

6. The combination as claimed in claim 5 wherein the common operator and inclined planes are insertable from either side of the magazine.

7. The combination as claimed in claim 1 wherein the means insertable in the spaces between said U-shaped members to raise and lower said elongated articles comprise a flexible band.

8. The combination as claimed in claim 1 wherein a magazine may be stacked on top of a similar magazine.

9. The combination as claimed in claim 1 wherein a magazine can be nested within a similar magazine when the end walls are folded down or removed.

* * * * *